United States Patent [19]

Justus

[11] Patent Number: 4,685,183
[45] Date of Patent: Aug. 11, 1987

[54] CONTROLLED DEFLECTION ROLL

[75] Inventor: Edgar J. Justus, Beloit, Wis.

[73] Assignee: Beloit Corporation, Beloit, Wis.

[21] Appl. No.: 635,182

[22] Filed: Jul. 27, 1984

[51] Int. Cl.⁴ .............................................. B21B 13/02
[52] U.S. Cl. ............................. 29/116 AD; 100/162 B
[58] Field of Search ....................... 277/DIG. 8, 3, 70; 100/162 B; 29/116 R, 110, 116 AD, 113 AD

[56] References Cited

U.S. PATENT DOCUMENTS

| | | | |
|---|---|---|---|
| 3,611,529 | 10/1971 | Hold et al. | 29/116 AD |
| 4,091,517 | 5/1978 | Lehmann et al. | 29/113 AD |
| 4,123,068 | 10/1978 | Van Gorder | 277/70 X |
| 4,284,280 | 8/1981 | Bertram et al. | 277/70 X |
| 4,506,421 | 3/1985 | Appenzeller et al. | 29/116 AD |

FOREIGN PATENT DOCUMENTS

| | | | |
|---|---|---|---|
| 3026063 | 2/1982 | Fed. Rep. of Germany | 277/3 |
| 40-5835 | 2/1965 | Japan | 29/116 AD |

Primary Examiner—Howard N. Goldberg
Assistant Examiner—Timothy V. Eley
Attorney, Agent, or Firm—Hill, Van Santen, Steadman & Simpson

[57] ABSTRACT

A controlled deflection roll including a rotary tubular roll shell carried on a stationary shaft extending through the roll shell, the roll shell supported on the shaft for pressure engagement along a working face with an opposing member to form a pressing operation, the chamber between the shaft and roll shell being pressurized by fluid induced past a seal between the shaft and roll shell on the oncoming side of the pressure chamber such as by a specially shaped seal having a trailing lip and releasing pressure from the pressure chamber to maintain a predetermined pressure.

16 Claims, 6 Drawing Figures

CONTROLLED DEFLECTION ROLL

BACKGROUND OF THE INVENTION

The present invention relates to improvements in a controlled deflection roll of the type wherein a pressure roll shell is rotatably carried on a stationary shaft and supported by a fluid pressure chamber between the roll shell and shaft so that the roll shell is carried on a chamber of fluid, and its working force is transmitted through the fluid to the shaft.

More particularly, the invention relates to improvements in a structure and method for pressurizing the pressure chamber between the roll shell and shaft. In structures of the type heretofore used such as disclosed in U.S. Pat. No. 2,908,964 Appenzeller and successive modifications of the concept shown therein, the pressure chamber between the roll shell and shaft was pressurized by a pump which pumped a fluid such as oil into the pressure chamber. In accordance with the concept of this type of roll, the roll shell engages another roll along the working face to form a pressure nip. The nip is kept essentially straight by pressurizing the chamber between the shaft and shelf with pumped oil, and the forces in the nip are transmitted from the roll shell through the fluid to the shaft so that the shaft bends, but the roll shell sees only the hydrualic pressure of the fluid and is maintained essentially straight.

This type of construction requires the provision of an oil pump with accurate control mechanism to control the pressurization in the chamber. Further, pressure must be present in the chamber at start-up to avoid abrasion and scoring the inner surface of the roll shell against the shaft, and the pressure in the chamber must be maintained at a predetermined pressure in accordance with the nip pressure needed for the pressing operation. Seals are provided to prevent leakage from the pressure chamber and this has heretofore been the sole function of such seals. Leakage past the seals had to be compensated for by delivery of oil to the pressure chamber. Since the nip pressure was determined wholly by the pressure in the chamber, accurate control of the pressure and of the pump had to be maintained and erratic behavior such as pump pulsations or pump failure could not be countenanced. Also, the capacity of the pump had to be sufficient to compensate for the leakage past the seals and to be sufficient to deliver sufficient fluid for operation under maximum nip pressure conditions. Since the roll often was called upon to operate in either direction, the seals had to be designed so that they could accommodate rotation in either direction without substantial change in leakage.

It is an object of the present invention to provide an improved controlled deflection roll which eliminates the necessity for a controlled pressure pump to pressurize the chamber in a controlled pressure roll.

A further object of the invention is to provide an improved method and apparatus whereby the roll is self-loading and self-pressurizing so that the working pressure in the chamber will automatically be provided with rotation of the roll and so that operation of a pressure pump does not have to be coordinated with operational speeds and pressures of the roll shell.

A general object of the invention is to provide an improved roll shell construction which is capable of maintaining a more uniform nip pressure and operating more reliably so as to avoid accidental damage to the roll shell and shaft with equipment failure and which is capable of continued long term operation with improvements over structures and methods heretofore available.

A feature of the invention is to provide a controlled deflection roll embodying a roll shell carried on a stationary shaft with a pressure chamber between the shaft and shell for carrying the shell wherein the chamber is pressurized by fluid induced to move past the seal at the oncoming side of the pressure chamber due to movement of the inner surface of the roll shell past the seal and a pressure relief passage is provided to relieve excess pressure within the chamber and maintain the chamber at a constant desired pressure.

A further object of the invention is to provide an improved seal for a controlled deflection roll so that the roll is self-energizing eliminating the need for a pump to create lubrication pressure, wherein the design has fewer parts and is more cost effective than that heretofore available in the prior art, and wherein the seal allows lubrication pressure to develop in both directions of rotation.

Other objects, advantages and features of the invention will become more apparent with the teaching of the principles thereof in the specification, claims and drawings, in which:

DESCRIPTION OF THE PREFERRED EMBODIMENTS

Figure 1:
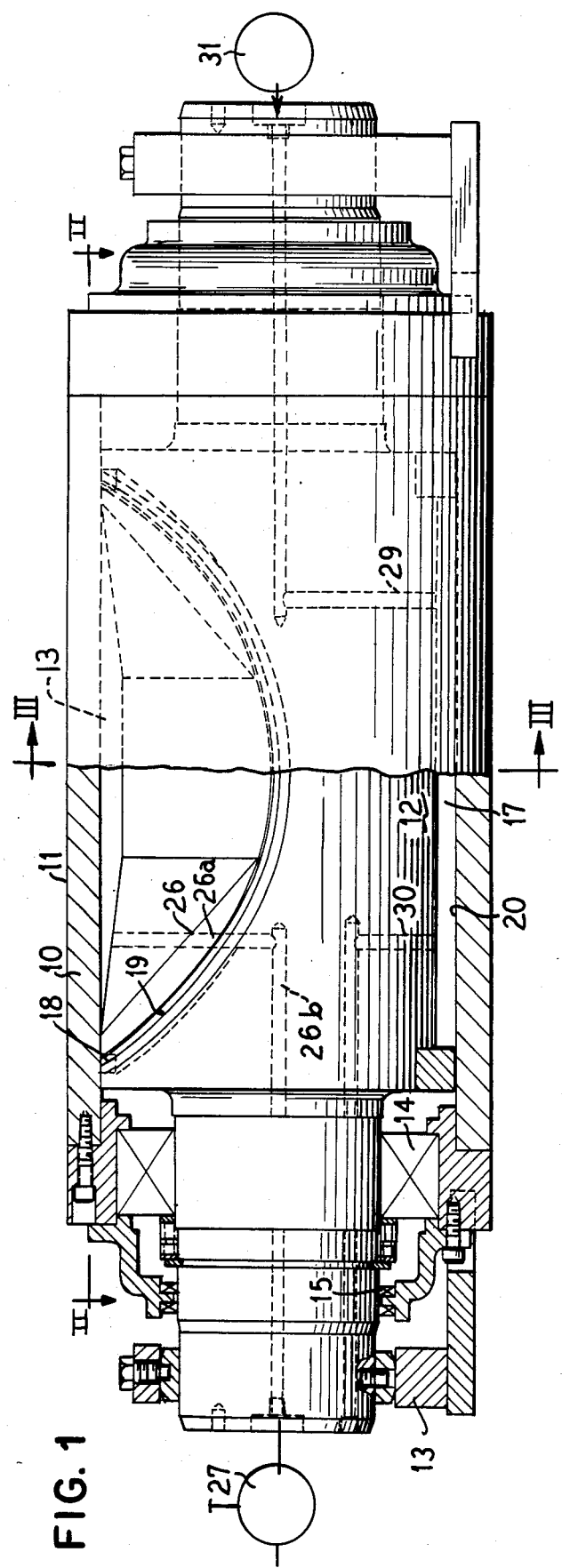
FIG. 1 is an elevational view in section with the section taken through the axis of a controlled deflection roll constructed and operating in accordance with the principles of the present invention.

FIG. 1 illustrates a side elevational view in section of a roll used for the pressure treatment of materials. In particular, the roll is well suited for use in the paper industry wherein a paper web undergoes a series of pressing operations to dewater the web. For uniform dewatering of the web across its substantial width, it is important that the roll shell provide an axially straight nip and that the nip pressure be uniform across the width. For accomplishing this purpose, various forms of rolls have been provided in the art which may be termed controlled deflection rolls.

As illustrated in FIG. 1, the controlled deflection roll includes an outer cylindrical or tubular roll shell 10 which has a smooth outer surface and which is adapted to engage an opposing force along a working face 11. Frequently, the roll will be used in combination with another roll to form a roll couple and the nip between the two rolls will receive a paper web along with a felt for receiving water pressed therefrom. At substantial nip pressures, the roll shell would tend to bend along its length causing an undesired arcuate nip and inducing extraneous forces into the nip due to the bending of the roll which would create unequal pressures and unequal dewatering of the web. By supporting the roll shell on a fluid and preferably a hydaulic fluid such as oil, the roll shell sees only a supporting hydraulic fluid along its working face 11 which transmits a uniform force thereto so that the roll shell does not bend and the nip line is essentially straight. The force which is transmitted to the fluid is in turn transmitted to a stationary shaft 12 which extends through the roll shell. The shaft is such that a clearance is provided between it and the inner surface 20 of the roll shell and in this clearance space opposite the working face 11 of the roll shell is a pressure chamber 16. The fluid in the pressure chamber is contained by a seal 18 carried on the shaft such as by being seated in a groove 19 on the shaft. The concept of the seal, and its construction and location relative to the roll shell and shaft is unique and obtains a self-energizing arrangement wherein the pressure chamber 16 is automatically pressurized by an induced flow of oil carried on the inner surface of the roll shell and the induced pressurized flow of oil is maintained at a uniform pressure within the chamber 16 by a relief passage 26.

The shaft 12 is stationary within the rotatable roll shell such as by being mounted on a suitable framework 13. The roll shell is maintained in its rotatable position by bearings 14 at each end of the roll shell. The roll shell has an end cap with a dust seal 15 to protect the bearing. The roll shell may be driven in rotation or may rotate due to engagement with the web of material or the opposing roll.

Figure 2:
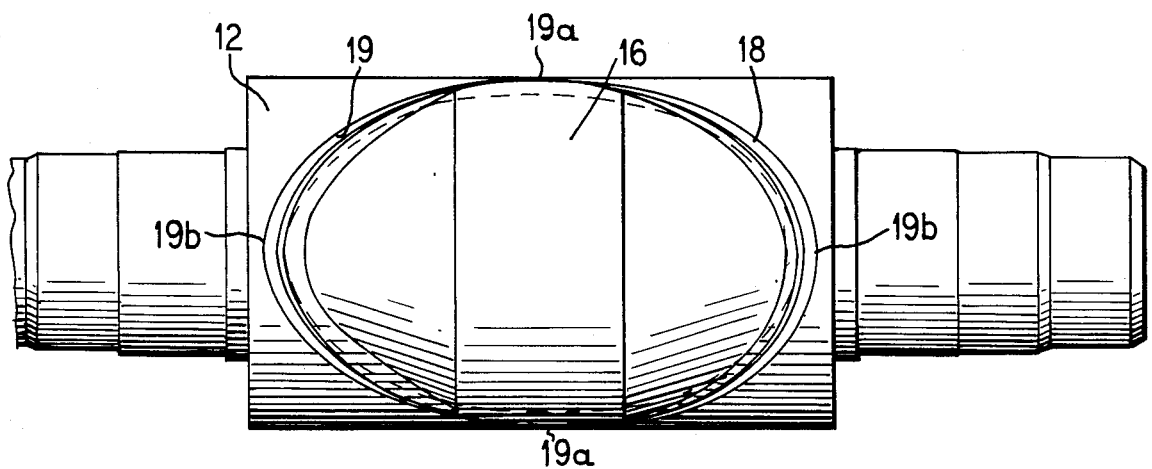
FIG. 2 is a plan view of the shaft taken substantially along line II—II of FIG. 1 with the roll shell removed.

As illustrated in FIGS. 1 and 2, the groove 19 in which the seal 18 is seated is uniquely shaped so that it has the appearance of an oval when viewed from the location of the work face 11. The sides 19a of the groove which carries the seal extend at a mid-portion of the shaft substantially at the diametral or center location of the shaft. At this location, relative downward deflection of the shaft does not change the spacing of the shaft and the inner surface 20 of the roll shell. Toward the ends of the groove 19b, FIG. 2, slight changes in spacing will occur and the seal has sufficient elasticity to compensate for such slight changes. Basically, the groove is shaped so that as it progresses inwardly from the end of the shaft toward the center, and the amount of bending of the shaft increases relative to the roll shell, the oval groove moves closer and closer toward the diametral center of the shaft so that the change in spacing between the shaft and shell at the location of the seal is maintained at a predetermined minimum.

With reference to FIG. 1, pressure is maintained in the chamber 16 at a predetermined level by control of the bleed off of pressure. The chamber is constantly charged by lubricating fluid being dragged past the seal so that a constant supply is available to the chamber to maintain it pressurized. For bleeding off the excess oil, the pressure relief passageway 26 has a first portion 26a which is drilled radially from the pressure chamber 16 of the shaft. A second portion 26b of the passageway extends axially from the portion 26a to a sump, not shown, at the end of the shaft. Connected in the passage is a controlled pressure relief valve 27 which is set at a predetermined relief pressure dependent upon the force desired at the working face 11 of the roll shell.

Figure 4:
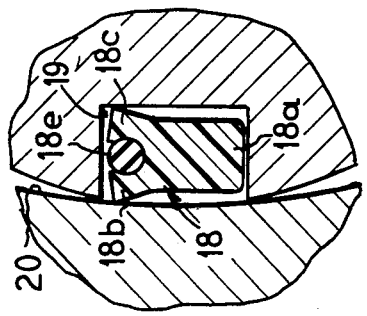
FIG. 4 is an enlarged detail view of the seal of FIG. 3.
Figure 3:
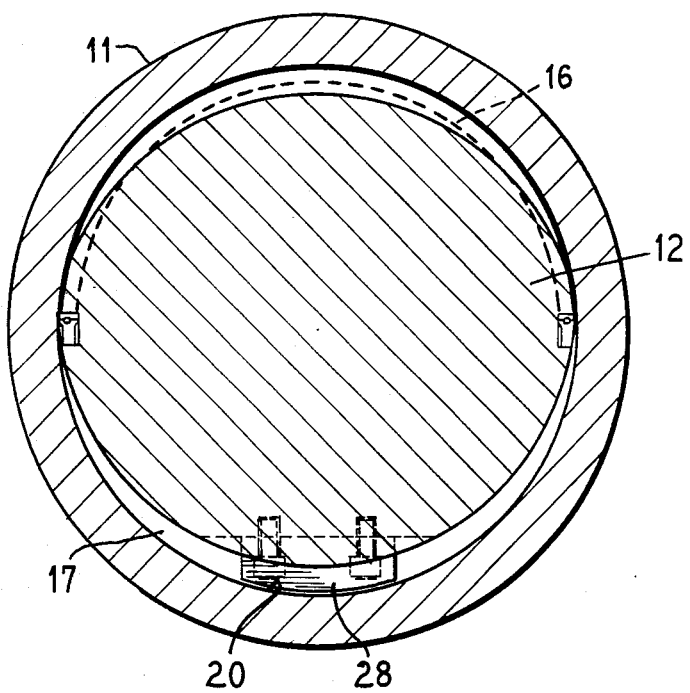
FIG. 3 is a vertical sectional view taken substantially along line III—III of FIG. 1.

FIG. 3 illustrates the relationship of the center shaft 12 relative to the inner surface 20 of the roll shell. The continuous seal 18 is uniquely shaped, and is shown in greater detail in FIG. 4. The seal 18 seats in the groove 19 and has a base 18a which extends downwardly relative to the working face 11 of the roll shell. The seal 18 has a first lip 18b which extends resiliently against the inner surface 20 of the roll shell. The roll shell may rotate in either direction and the lip 18b at the oncoming side of the pressure chamber 16 relative to the rotation of the roll shell will trail. Thus, oil which is carried down in the nonpressure area 17 between the shaft and roll shell is induced to flow past the seal in a pumping action to pressurize the pressure chamber 16. The friction between the oil and the inner smooth surface 20 of the roll shell will drive the oil past the seal with a continual pumping action. On the downstream or offrunning side of the pressure chamber, the corresponding lip 18b of the seal provides a seal which prevents escape of the oil.

The seal has a second inner lip 18c which bears against the base of the groove 19 to urge the seal outwardly toward the roll shell. A integral bead 18e between the lips 18b and 18c urges the lips toward spread position.

Figure 5:
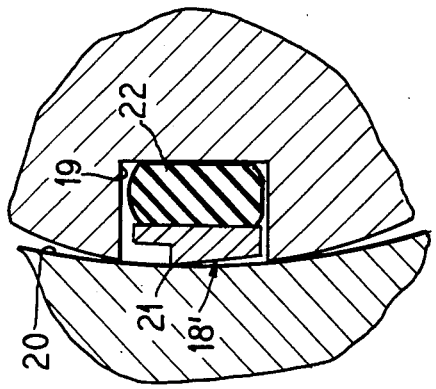
FIG. 5 is an enlarged detailed sectional view of another form of seal.

In another form of seal, as shown in FIG. 5, a seal 18' seats in the groove 19. The seal of FIG. 5 has a base portion 22 which seats in the groove and a trailing lip portion 21 which slides against the inner surface 20 of the roll shell. The lip portion is such so that it will trail on the oncoming side of the pressure chamber so that oil will be pumped past the seal into the pressure chamber. On the downstream or offrunning side, the lip will extend in the direction of the pressure chamber so that a sealing effect will result preventing the escape of oil.

Figure 6:
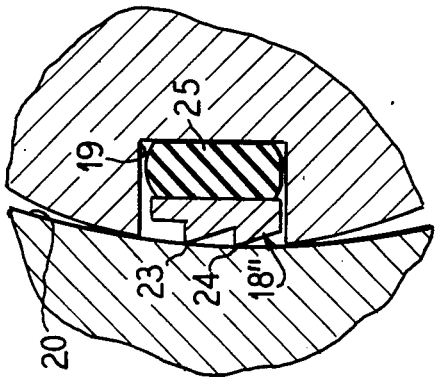
FIG. 6 is an enlarged detailed sectional view of still another form of seal.

In the arrangement illustrated in FIG. 6, a seal 18" is provided with a base portion 25 and dual trailing lips 23 and 24. The function of the seal in FIG. 6 is essentially the same as in FIG. 5 with dual lips providing a more effective seal on the offrunning side of the pressure chamber.

As shown in FIGS. 1 and 3, pads 28 are provided at the end of the shaft to prevent abrasion between the roll shell and shaft in the event a work load at 11 is suddenly removed.

A supply of oil to continually coat the inner surface 20 of the roll shell is provided through a supply line 29 which extends axially from the end of the shaft and then radially to open into the nonpressurized chamber 17. Excess oil from the chamber 17 is bled off through a return line 30 which connects through a radial portion and an axial portion extending through the shaft, and a circulating pump means may be provided for continually circulating oil from the line 29 through the space 17 and out of the line 30 and the recirculating oil may be cooled for a cooling effect on the shaft and roll shell. Also, if the roll shell is intended to operate at a predetermined temperature, a temperature may be maintained by maintaining the oil supply through the line 29 at said predetermined temperature. For this purpose, an oil conditioner 31 may be supplied in the supply line. 31 indicates schematically a supply pump and oil conditioner.

In operation the mechanism is started by the roll shell 10 rotating. This will immediately drag oil up from the nonpressurized chamber 17 beneath the shaft 12, and this oil is pumped past the seal 18 on the oncoming side of the pressure chamber 16. If rotation of the roll is in a clockwise direction, oil will be pumped past the seal shown on the lefthand side of FIG. 3, and if rotation of the is roll counter-clockwise, oil will be pumped past the seal shown on the righthand side. Thus, the pressure chamber 16 will be pressurized along its full length because one-half of the seal 18 will be located on the oncoming side of the pressure chamber 16 relative to rotation of the roll shell 10. Correspondingly, one-half of the seal 18 will be on the offrunning side and will provide an effective seal preventing escape of oil from the chamber 16. The pressure relief valve 27 will be set to maintain a predetermined pressure in the pressure chamber 16 which will be in accordance with the nip pressure desired along the working face 11 of the roll shell. At higher speeds obviously more oil will be pumped into the pressure chamber, but this will not affect the controlled pressure which is maintained by the relief valve 27. The arrangement has been found to deliver sufficient oil under pressure to the pressure chamber to operate at maximum desired nip pressures and no other supply source for a pressurized fluid is needed or provided.

Thus, it will be seen that I have provided an improved controlled deflection roll construction and method of operating which avoids disadvantages of the prior art and meets the objectives and advantages above set forth. The need for operating parts such as a pressure pump have been eliminated and assurance is obtained that the roll will be self-charging immediately on start-up. The seal arrangement allows lubrication pressure to develop in both directions of rotation, and uniform pressure is controlled by bleeding oil from the sealed chamber. The design has fewer parts and is far more cost effective than devices heretofore available.

I claim as my invention:

1. A controlled deflection roll comprising in combination:
   a rotary tubular roll shell having an outer surface for pressure engagement along a working face to perform a pressing operation;
   a stationary shaft extending through the roll shell supported at its ends for carrying the shell defining a pressure chamber between the working face area of the shell and the shaft for transmitting forces from the roll shell to the shaft and supporting the shell by fluid pressure in the chamber;
   and a seal carried on the shaft between the shaft and shell maintaining pressure in the chamber;
   said seal shaped on the leading side of the chamber relative to the direction of shell rotation to induce a flow of fluid carried by the inner surface of the roll shell past the seal to pressurize said chamber, and said seal shaped on the trailing side of the chamber to prevent the escape of fluid from said chamber.

2. A controlled deflection roll constructed in accordance to claim 1:
   wherein said seal has a lip on the leading side of the chamber slidingly engaging the inner surface of the roll shell and trailing in the direction of roll rotation for inducing the movement of fluid past the seal for pressurizing the chamber.

3. A controlled deflection roll constructed in accordance with claim 1:
   including first and second seals between the shaft and shell wherein at least one of said seals has a lip on said leading side of the chamber sealingly engaging the inner surface of the roll shell and trailing in the direction of roll rotation for inducing a flow of fluid past the seal into the chamber.

4. A controlled deflection roll constructed in accordance with claim 3:
   wherein both of said seals have a lip trailing in the direction of movement of the inner surface of the roll shell and located on the leading side of the chamber.

5. A controlled deflection roll constructed in accordance with claim 1:
   wherein said seal is of uniform shape for its entire length surrounding said chamber and is constructed to induce a flow of fluid past the seal into said chamber with rotation of the roll shell in either direction.

6. A controlled deflection roll constructed in accordance with claim 1:
   wherein said seal is seated in a groove in said shaft.

7. A controlled deflection roll constructed in accordance with claim 1:
   wherein the shape of said seal as viewed from the working face of the roll shell is oval in shape extending substantially to the diametral center of the shaft at its axial mid-portion.

8. A controlled deflection roll constructed in accordance with claim 1:
   wherein the operation of said seal in inducing the flow of fluid into the chamber provides the sole source of pressurization for the chamber.

9. A controlled deflection roll constructed in accordance with claim 1:
   including a release passage extending through the shaft and communicating with said chamber and with a source of lower pressure so that an excess of fluid in said chamber may be removed.

10. A controlled deflection roll constructed in accordance with claim 9:
    including a pressure release valve in said passage for releasing pressure from the chamber at a predetermined level.

11. A controlled deflection roll constructed in accordance with claim 1:
    including a continuous recess in said shaft with said seal located in the recess, said seal having a base portion seated in the recess and a lip portion extending from the base portion projecting in the direction of roll rotation in sliding engagement with the inner surface of the roll shell.

12. A controlled deflection roll comprising in combination:
    a rotatable tubular roll shell having an outer surface for pressure engagement along a working face with an opposing member to perform a pressing operation;
    a stationary shaft extending through the roll shell supported at its ends for carrying the shell and defining a pressure chamber between the working face area of the shell and the shaft for transmitting forces from the roll shell to the shaft and supporting the shell by fluid pressure in the chamber;
    a seal carried on the shaft between the shaft and shell maintaining pressure in the chamber;
    and a pressure release passage communicating with the chamber and being the sole passage communicating with said chamber with the chamber pressurized by a flow of fluid induced past the seal by rotation of the roll shell.

13. A controlled deflection roll constructed in accordance with claim 12:
    including a pressure relief valve in said passage settable to release fluid from the chamber at a predetermined pressure.

14. The method of pressurizing a fluid support chamber surrounded by a seal and located between a stationary shaft and a tubular roll shell carried on the shaft adapted for rotation and pressure engagement along a working face with an opposing member to perform a pressing operation, the method comprising:

pressurizing the chamber by inducing a flow of fluid past the seal with a rotation of the roll shell at the oncoming side of the chamber relative to roll rotation.

15. The method of pressurizing a fluid support chamber surrounded by a seal and located between a stationary shaft and a tubular roll shell carried on the shaft adapted for rotation and pressure engagement along a working face with an opposing member to perform a pressing operation in accordance with the steps of claim 14:

wherein the fluid induced by the flow past the seal provides the sole pressurizing force for the chamber.

16. The method of pressurizing a fluid support chamber located between a stationary shaft and a tubular roll shell carried on the shaft adapted for rotation and pressure engagement along a working face with an opposing member to perform a pressing operation in accordance with the steps of claim 14:

including releasing oil from the chamber for maintaining a predetermined pressure in said chamber.

* * * * *